No. 742,685. PATENTED OCT. 27, 1903.
A. H. LEACH.
OLIVE OR PICKLE SPOON.
APPLICATION FILED OCT. 30, 1902.
NO MODEL.
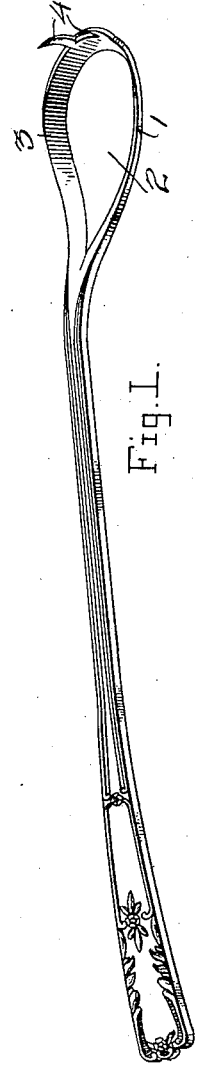
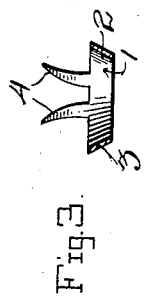
Inventor
Arthur H. Leach.
Witnesses
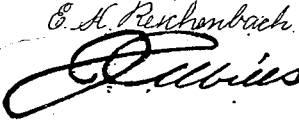
By 
Attorneys
THE NORRIS PETERS CO., PHOTO-LITHO., WASHINGTON, D. C.

No. 742,685.

Patented October 27, 1903.

UNITED STATES PATENT OFFICE.

ARTHUR H. LEACH, OF MIDDLEBORO, MASSACHUSETTS.

OLIVE OR PICKLE SPOON.

SPECIFICATION forming part of Letters Patent No. 742,685, dated October 27, 1903.

Application filed October 30, 1902. Serial No. 129,476. (No model.)

*To all whom it may concern:*

Be it known that I, ARTHUR H. LEACH, a citizen of the United States, residing at Middleboro, in the county of Plymouth and State of Massachusetts, have invented certain new and useful Improvements in Olive or Pickle Spoons; and I do declare the following to be a full, clear, and exact description of the invention, such as will enable others skilled in the art to which it appertains to make and use the same.

My invention is an improved olive or pickle spoon; and it consists in the peculiar construction and arrangement of devices hereinafter fully described and claimed.

The object of my invention is to provide an improved spoon which is especially adapted for use in taking olives, pickles, and the like from bottles, jars, and dishes; and it consists in a spoon having a rim in place of the bowl, said rim being provided at its lower end with upturned prongs, one or more, to engage or bear under the olive or pickle.

In the accompanying drawings, Figure 1 is a perspective view of a spoon embodying my improvements, and Fig. 2 is a detail longitudinal sectional view taken through the draining-bowl of the spoon. Fig. 3 is a detail transverse sectional view taken on a plane intersecting the bowl of the spoon and looking toward the lower or outer end thereof.

In carrying out my invention I construct a spoon. The bottom of the bowl is cut away and forms an opening 2, which is almost coextensive with the remaining portion, thereby leaving the bowl in the form of a rim or skeleton 3. The rim is substantially ovoidal or egg-shaped, with the larger diameter at the tip and the apex at the handle instead of the reverse, as in the ordinary spoon.

The rim of the spoon has the flare or transverse curvature of the usual bowl, and the outward end is provided with a plurality of upwardly-projecting prongs or tines 4, which may act as hooks in operation. These prongs are located at a suitable distance apart on opposite sides of the longitudinal center of the rim and are formed by extending the rim upward in the same plane at those points and having substantially the same thickness and curvature as the rim. The inner or adjacent edges of the prongs flare or diverge from each other toward these tips, so as to form a wedge-shaped opening into which the article being removed can be forced by pressure against the sides of the vessel, the edges of the prongs being thin and readily entering the article and holding it against accidental displacement even though the tips or ends of the prongs should not enter or engage therewith. By constructing the spoon in this manner the broadest part of the rim is placed at the tip, which will give it a greater bearing on the article being removed, and thereby prevent the liability of the article, which is round, as in olives, or oblong, as in pickles, slipping to one side or the other, as would be the case with the ordinary pointed bowl. In addition to this it gives room for spacing the prongs a sufficient distance apart and yet leaves them in substantially the same plane with each other, whereby their edges can enter the article whether their tips do or not, or the article may be impaled upon one or both of the prongs, and thus be removed from the vessel, or it may be held loosely within the rim. In either instance the article is removed from the vessel without the liquor or pickling fluid, as that is drained off through the opening in or above the top of the rim.

By constructing the rim with a single opening almost coextensive therewith, instead of a series of smaller openings, the ordinary-sized articles may be so firmly seated therein that they will not readily fall out even though they were not engaged by the prongs, the rim engaging with the article nearer the center than it could do with a bottomed bowl. This ability to hold the articles loosely is further increased by extending the prongs upward in the plane of the rim and slightly curving their tips to the rear.

In using the spoon it is inserted into the vessel and the rim or prongs or both caused to engage with the article to be removed, after which the spoon is removed with the accompanying article.

Having described my invention, I claim—

1. A spoon having a handle and an ovoidal rim at one end thereof, the widest portion of said rim being at the tip or point farthest from the handle and provided with upwardly-extending prongs, substantially in the same plane with said rim.

2. A spoon having a handle and an ovoidal transversely-curved rim, the widest portion of which rim is at the tip and provided with two upwardly-extending prongs, and the apex is at one end of the handle, said prongs lying substantially in the same plane with each other and with the rim at that point and diverging from each other toward their tips and curved to the rear.

In testimony whereof I have hereunto set my hand in presence of two subscribing witnesses.

ARTHUR H. LEACH.

Witnesses:
AUSTIN M. HOWARD,
PATRICK H. MATTHEWS.